United States Patent
Ye et al.

(10) Patent No.: US 11,025,946 B2
(45) Date of Patent: Jun. 1, 2021

(54) METHOD AND APPARATUS FOR VIDEO CODING

(71) Applicant: Tencent America LLC, Palo Alto, CA (US)

(72) Inventors: Jing Ye, San Jose, CA (US); Shan Liu, San Jose, CA (US); Stephan Wenger, Hillsborough, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/413,106

(22) Filed: May 15, 2019

(65) Prior Publication Data

US 2019/0387246 A1 Dec. 19, 2019

Related U.S. Application Data

(60) Provisional application No. 62/685,256, filed on Jun. 14, 2018.

(51) Int. Cl.
*H04N 19/52* (2014.01)
*H04N 19/44* (2014.01)
*H04N 19/70* (2014.01)
*H04N 19/30* (2014.01)
*H04N 19/176* (2014.01)

(52) U.S. Cl.
CPC .......... *H04N 19/52* (2014.11); *H04N 19/176* (2014.11); *H04N 19/30* (2014.11); *H04N 19/44* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2008/0219572 A1* | 9/2008 | Kim | H04N 19/105 382/236 |
| 2018/0199062 A1* | 7/2018 | Zhang | H04N 19/593 |
| 2019/0082191 A1* | 3/2019 | Chuang | H04N 19/423 |

\* cited by examiner

*Primary Examiner* — Clifford Hilaire
(74) *Attorney, Agent, or Firm* — Oblon, McClelland, Maier & Neustadt, L.L.P.

(57) ABSTRACT

A method of video decoding in a decoder is described. A coded video bit stream is received. The coded video bit stream includes a block. An integer value p1 of a first motion vector component and an integer value p2 of a second motion vector component are received. The integer value p1 is associated with a corner of the block and the integer value p2 is associated with another corner of the block. The first motion vector component and the second motion vector component are of a same type of motion vector component. A motion vector predictor of the block is interpolated from the integer value p1 and the integer value p2 based on a lookup table and one or more of operations that only include addition, subtraction, and multiplication. A sample of the block is reconstructed based on the interpolated motion vector predictor of the block.

20 Claims, 11 Drawing Sheets

METHOD AND APPARATUS FOR VIDEO CODING

INCORPORATION BY REFERENCE

This present disclosure claims the benefit of priority to U.S. Provisional Application No. 62/685,256, "Techniques for Motion Vector Predictor Interpolation in Video Coding," filed on Jun. 14, 2018, which is incorporated by reference herein in its entirety.

TECHNICAL FIELD

The present disclosure describes embodiments generally related to video coding and decoding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide method and apparatus for video encoding/decoding. In some examples, an apparatus includes processing circuitry for video decoding.

In one embodiment of the present disclosure, there is provided a method for video decoding in a decoder. In the method, a coded video bit stream is received. The coded video bit stream includes a block. An integer value p1 of a first motion vector component and an integer value p2 of a second motion vector component are received. P1 is associated with a corner of the block and p2 is associated with another corner of the block. The first motion vector component and the second motion vector component are of a same type of motion vector component. Further, a motion vector predictor of the block is interpolated from the integer value p1 and the integer value p2 based on a lookup table and one or more of operations that only include addition, subtraction, and multiplication. A sample of the block is reconstructed based on the interpolated motion vector predictor of the block.

In another embodiment of the present disclosure, there is provided an apparatus. The apparatus includes processing circuitry. The processing circuitry receives a coded video bit stream. The coded video bit stream includes a block. The processing circuitry receives an integer value p1 of a first motion vector component and an integer value p2 of a second motion vector component. P1 is associated with a corner of the block and p2 is associated with another corner of the block. The first motion vector component and the second motion vector component are of a same type of motion vector component. The processing circuitry interpolates a motion vector predictor of the block from the integer value p1 and the integer value p2 based on a lookup table and one or more of operations that only include addition, subtraction, and multiplication. Further, the processing circuitry reconstructs a sample of the block based on the interpolated motion vector predictor of the block.

Aspects of the disclosure also provide a non-transitory computer-readable medium storing instructions which when executed by a computer for video decoding cause the computer to perform the method for video coding. In the method, a coded video bit stream is received. The coded video bit stream includes a block. An integer value p1 of a first motion vector component and an integer value p2 of a second motion vector component are received. P1 is associated with a corner of the block and p2 is associated with another corner of the block. The first motion vector component and the second motion vector component are of a same type of motion vector component. Further, a motion vector predictor of the block is interpolated from the integer value p1 and the integer value p2 based on a lookup table and one or more of operations that only include addition, subtraction, and multiplication. A sample of the block is reconstructed based on the interpolated motion vector predictor of the block.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
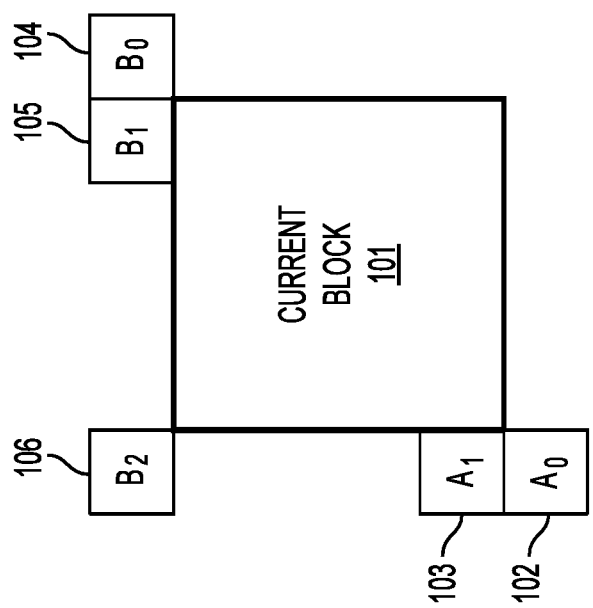
FIG. 1 is a schematic illustration of a current block and its surrounding spatial merge candidates in accordance with H.265.
Figure 2:
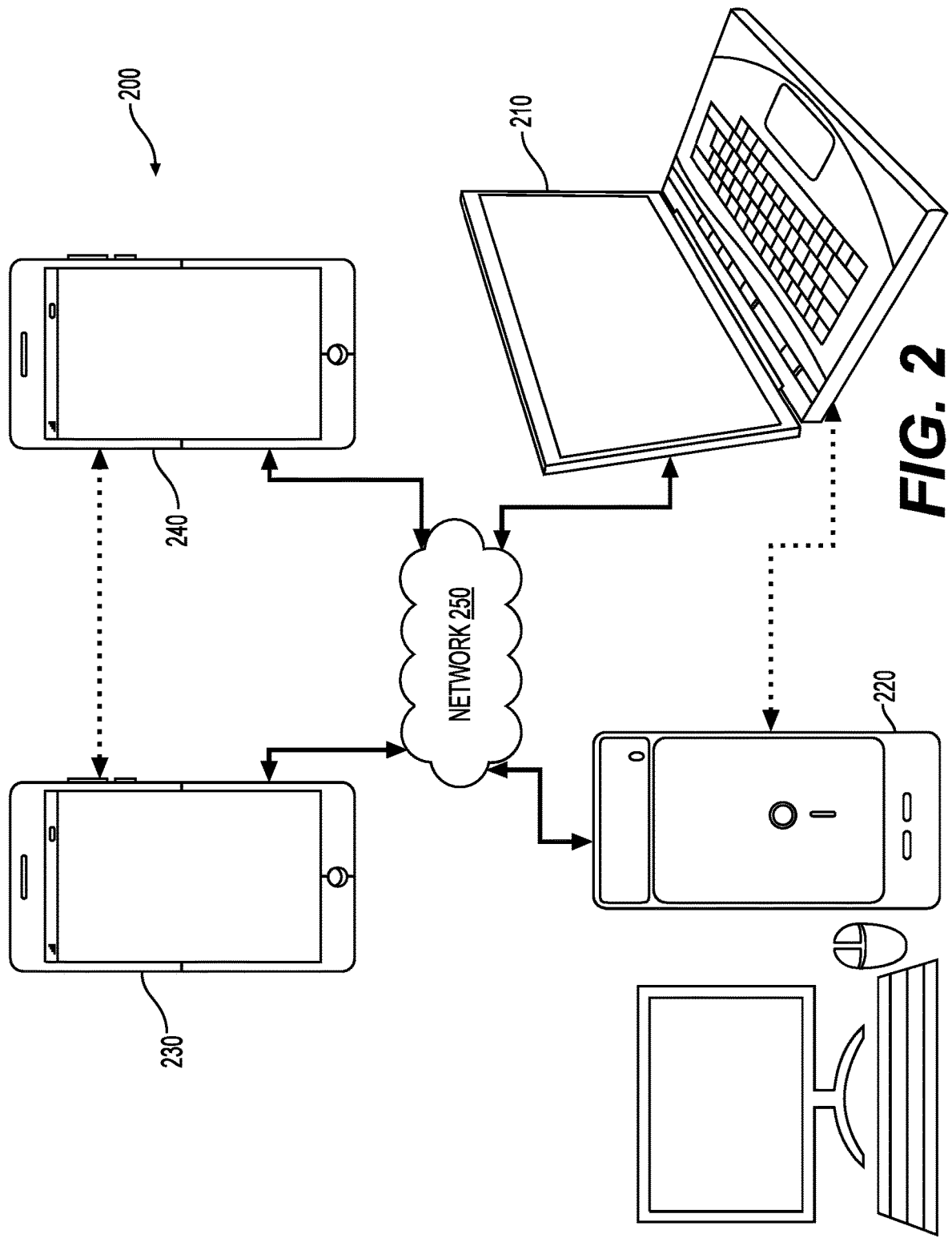
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bit streams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
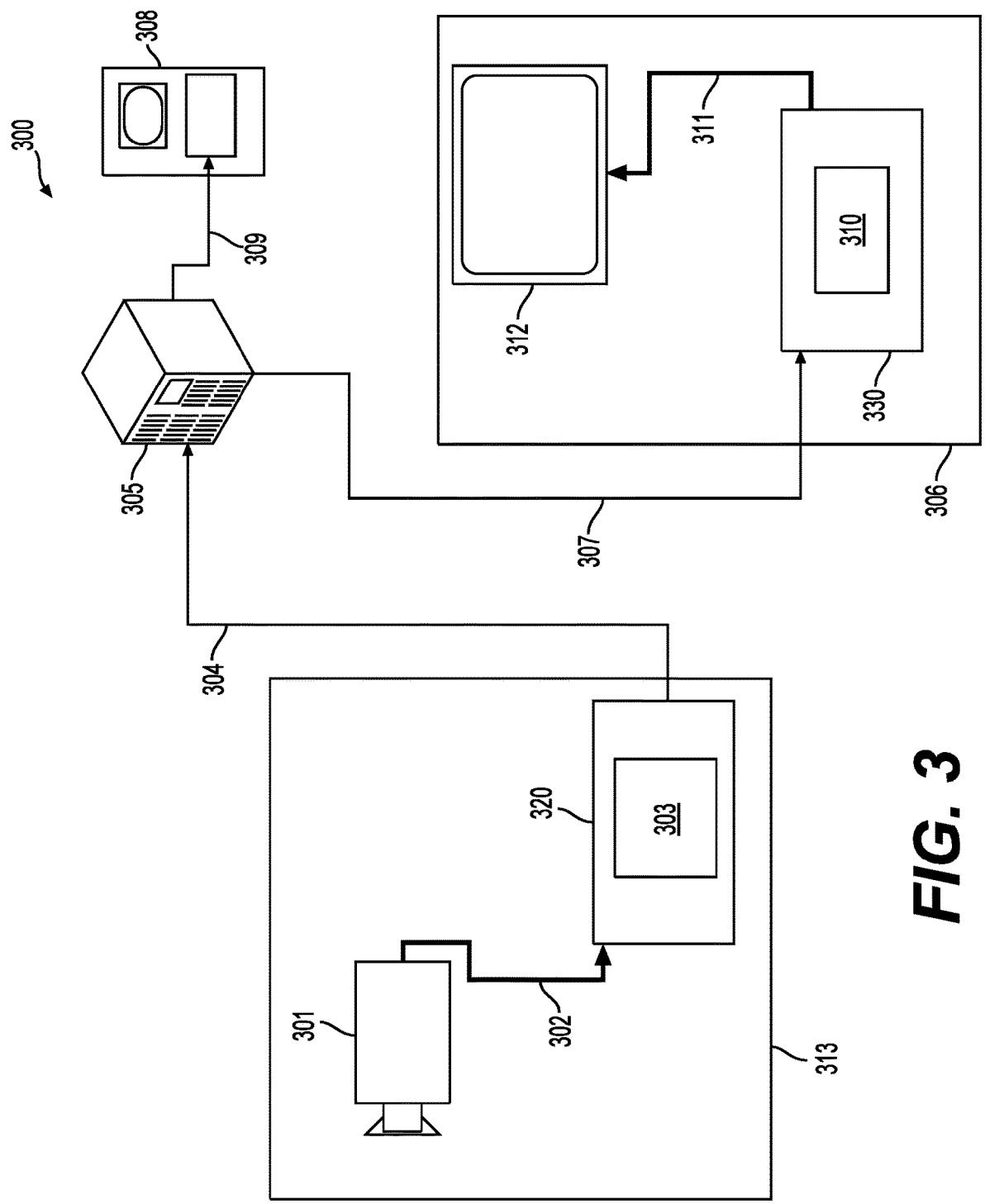
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bit streams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bit stream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bit streams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
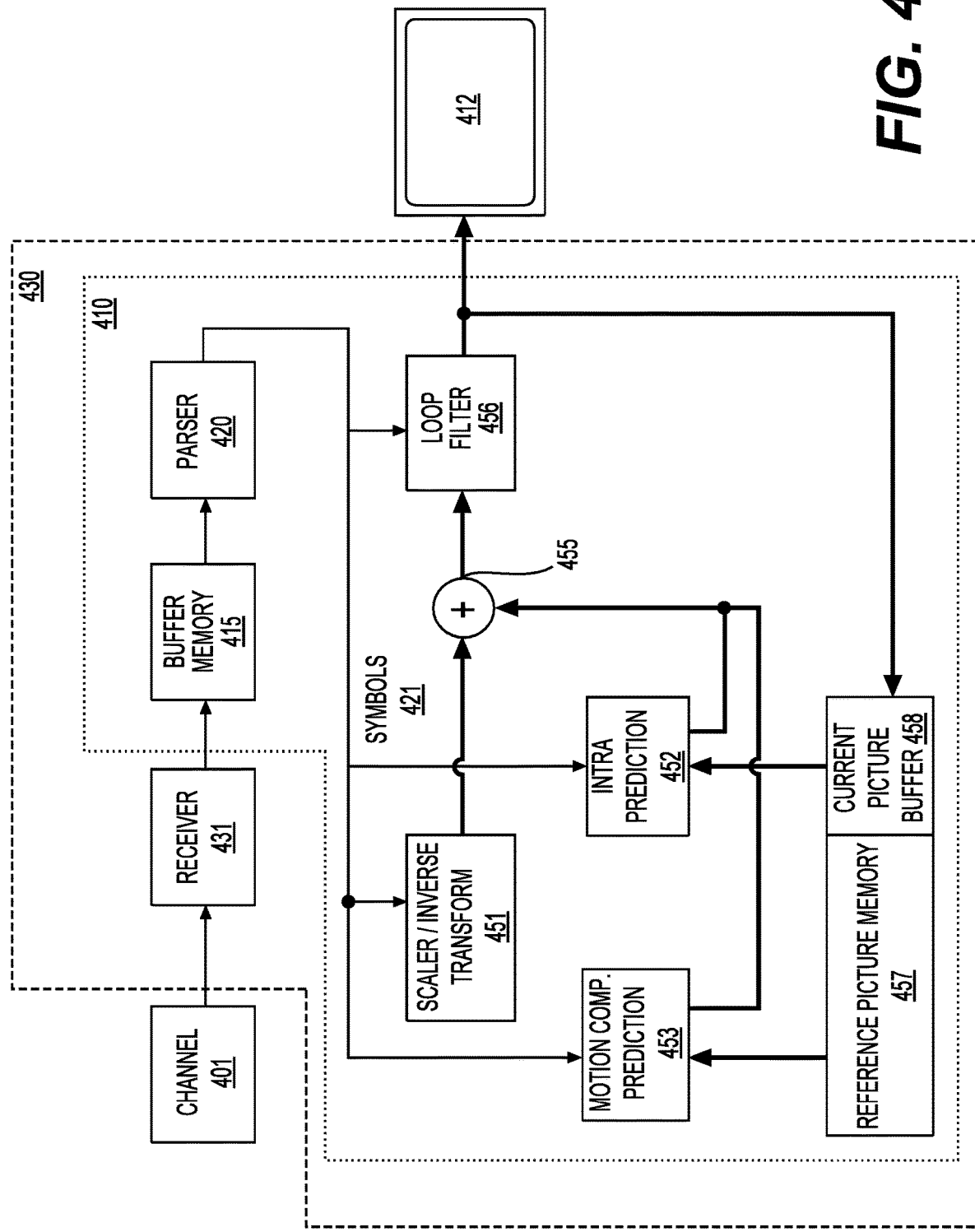
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, which can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bit stream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
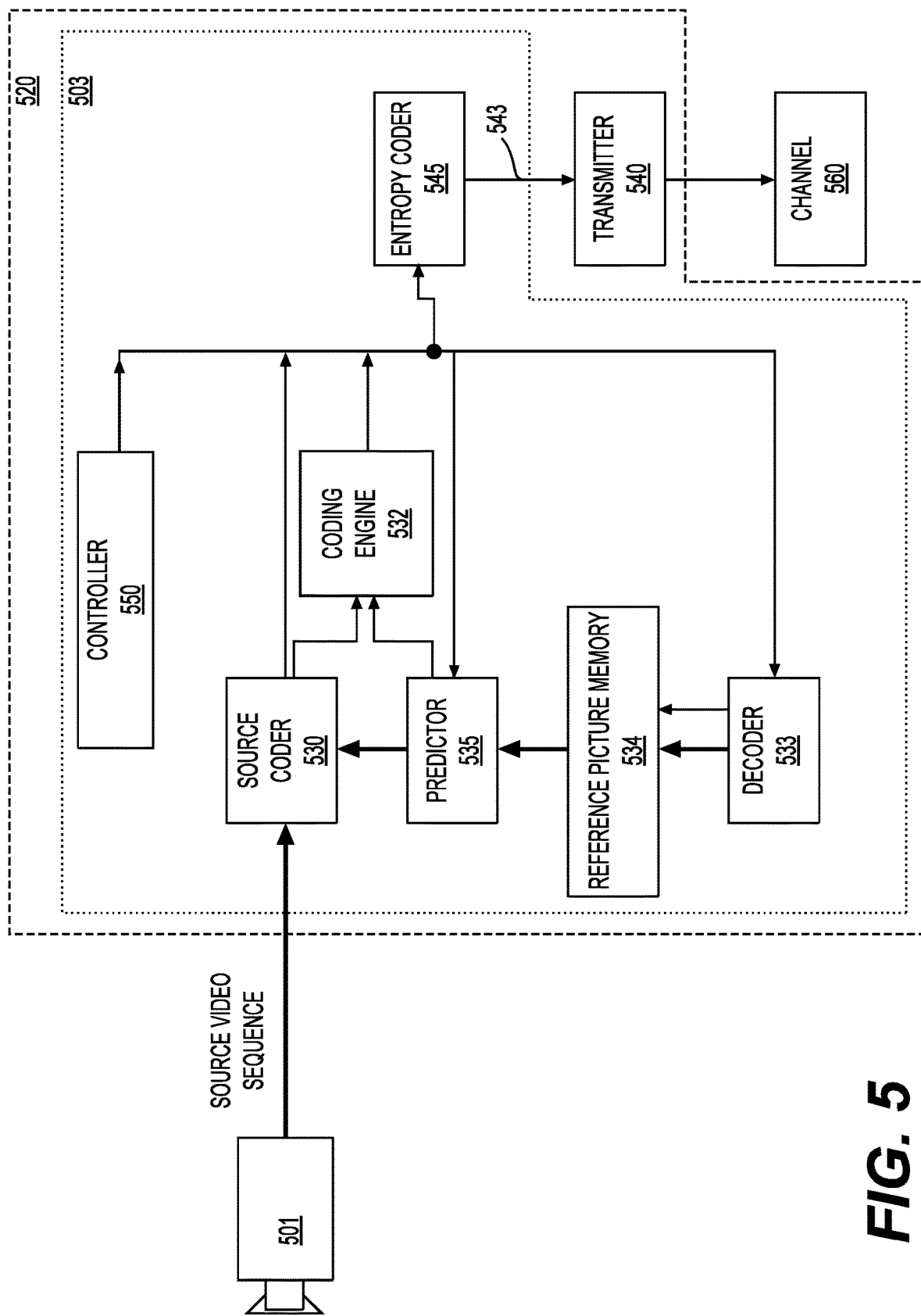
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bit stream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
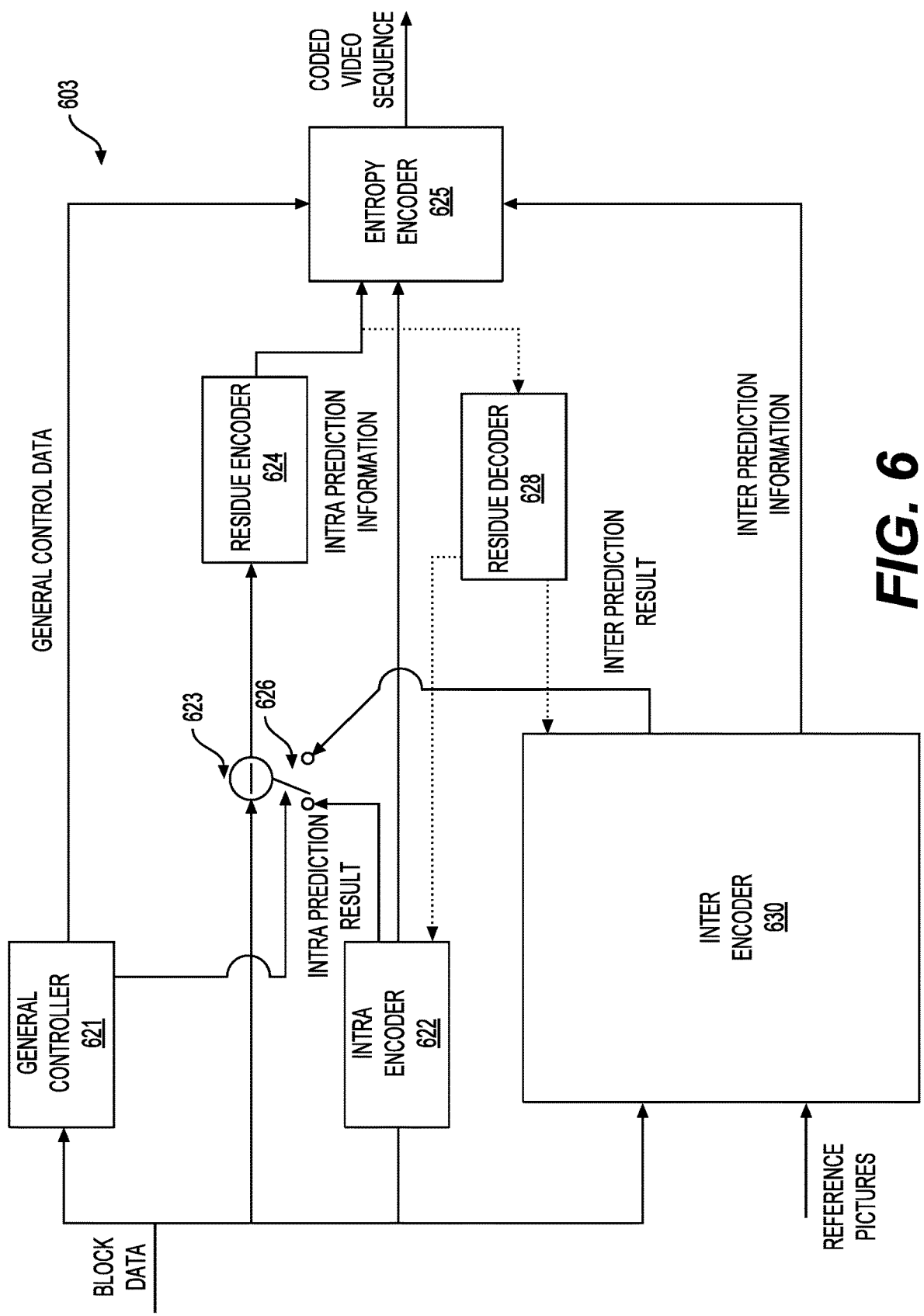
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bit stream; and when the mode is the inter mode, the general controller (621) controls the switch (626) to select the inter prediction result for use by the residue calculator (623), and controls the entropy encoder (625) to select the inter prediction information and include the inter prediction information in the bit stream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data in the frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bit stream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bit stream. Note that, according to the disclosed subject matter, when coding a block in the merge submode of either inter mode or bi-prediction mode, there is no residue information.

Figure 7:
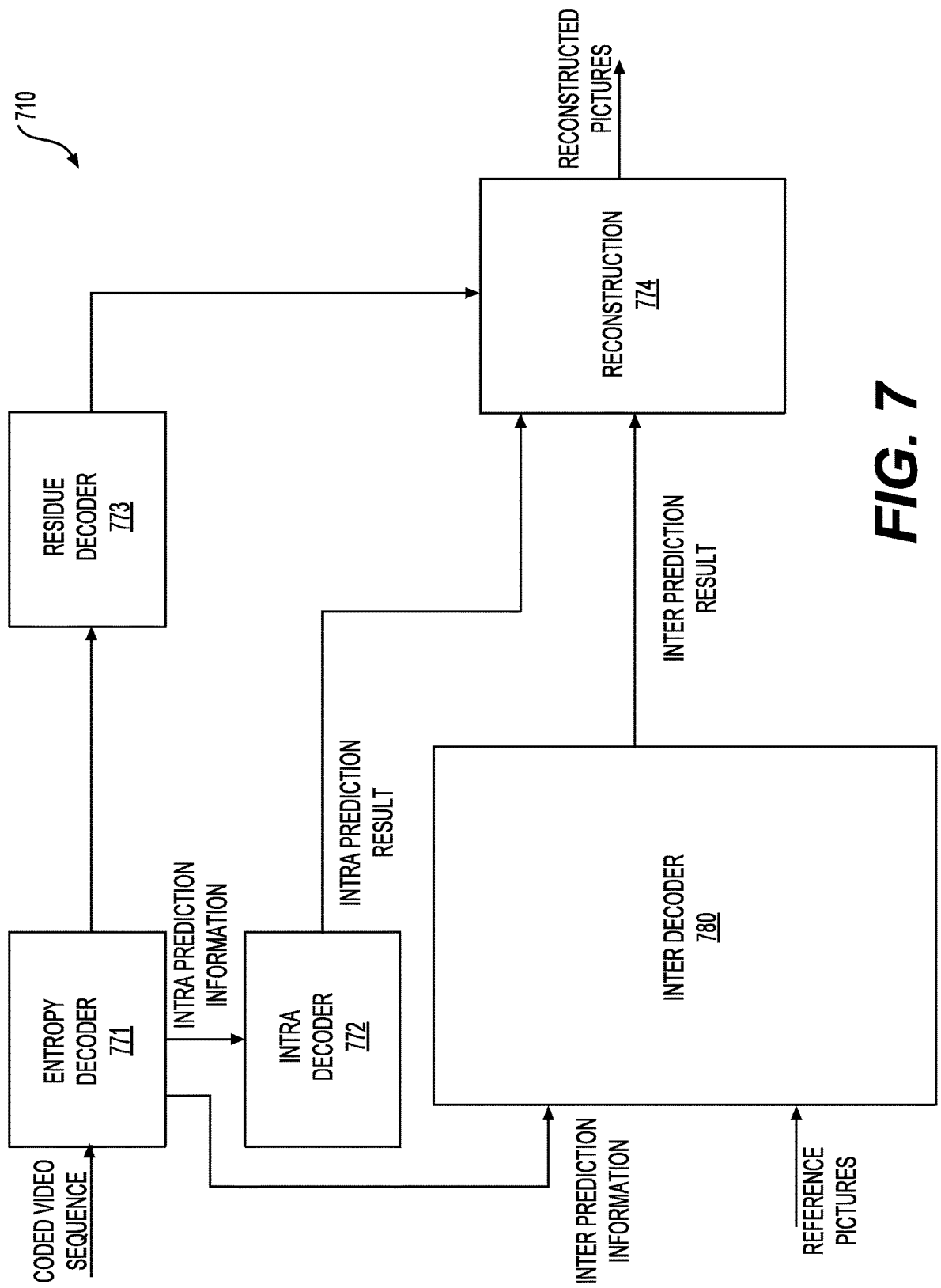
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques to simplify affine motion compensation with prediction offsets.

Generally, a motion vector for a block can be coded either in an explicit way, to signal the difference to a motion vector predictor (e.g., advanced motion vector prediction or AMVP mode); or in an implicit way, to be indicated completely from one previously coded or generated motion vector. The later one is referred to as merge mode, meaning the current block is merged into a previously coded block by using its motion information.

Both the AMVP mode and the merge mode construct candidate list during decoding.

As described above, motion compensation can include interpolation of sample values as fetched from the reference picture memory (457). In certain hardware environments, the implementation of hardware enabling a division operation in interpolation can be cost prohibitive. An exception is when the division is by a value restricted to be a power of two right shift operations can suffice. Video encoders and decoders need to include certain hardware to perform the division operations and the costs may be very high, especially when the interpolation needs to be performed frequently. Specifically, hardware, including chip surface area, clock cycles or pipeline stages, for performing interpolation that normally require division operations can be expensive and time consuming to design, and expensive to implement and produce. Therefore, techniques that avoid the use of division operations in interpolation can be required, for example to reduce the costs of the hardware for video encoders and decoders.

Related interpolation techniques rely on division operations when block sizes, in either or both of the horizontal and vertical dimensions, are not evenly divisible by a power of two and when some values that are associated with the corners of the block in the interpolation of motion vectors are known. For example, JVET-J0061 introduces a planar MV prediction technique, but requires a division operation. JVET-G1001, entitled "Algorithm Description of Joint Exploration Test Model 7 (JEM 7)," also includes a mechanism requiring a division in section 2.2.4. The corresponding software implements the division without relying on a division operation. However, JVET-G1001 describes the division of the sum of sample values instead of motion vector component values. The details of the technique implemented in JVET-G1001v1.zip are at least partly described in JCTVC-C206. Furthermore, the BMS-1.0rc1 source code, and specifically file CommonLib/IntraPrediction.cpp and the function IntraPrediction::xCalcLMParameterGeneralized( ), implement, among other things, a division function without the use of division operations for the purpose of calculating value alpha and beta in formulas (2) and (3) in section 2.2.4 of JVET-G1001. The division mechanism therein can work with integer divisors up to 512.

Embodiments of the present disclosure include a combination of two techniques: (1) planar motion vector prediction or similar techniques requiring the interpolation of metadata (such as motion vector components) and using division operations, and (2) the use of a number of hardware-friendly technologies such as converting table lookups into small tables and operations that include multiplications, shifts, and addition to substitute/approximate the interpolation without the use of division operations. An example of the first technique is described in JVET-J0061 and an example of the second technique is implemented, for example, in aforementioned IntraPrediction::xCalcLMParameterGeneralized and described in JCTVC-C206.

Figure 8:
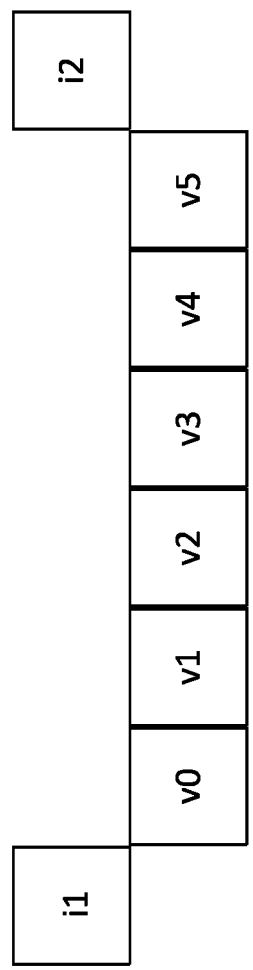
FIG. 8 shows an example of samples in a coding block in accordance with an embodiment.

FIG. 8 shows a row of an exemplary square block of six samples in each dimension. In FIG. 8, each of v0, v1, v2, v3, v4, and v5 is a value to be interpolated from two values i1 and i2. The two values i1 and i2 provide the basis for the interpolation of the six samples. This is only an example of a motion vector interpolation technique to improve coding efficiency. The interpolation techniques used for motion compensation are not limited to this example.

In an embodiment, the value vn is a horizontal (X) component of a motion vector predictor which can be used in the reconstruction of the block, and i1 and i2 are the horizontal (X) components of motion vectors associated with samples already reconstructed. Similarly, other components of the motion vector, such as the vertical (Y) component, may also be interpolated according to the present disclosure. I1 and i2 can be signaled as being motion vector predictors for the block during the reconstruction. The details of the signaling and the precise location associated with the sample values i1 and i2 are only exemplary. A person skilled in the art can readily understand such signaling, and can devise other positions for samples values i1 and i2 that can be equally beneficial for prediction.

In an embodiment, the motion vector predictors and values vn are predicted using linear interpolation. However, other forms of interpolation requiring a division by factors other than a power of two may also be used in the present disclosure. When non-linear interpolation is in use, even block sizes that are evenly divisible by a power of two may require a division operation.

In FIG. 8, i1 is associated with a corner of a current coding block (e.g., the square block) and i2 is associated with another corner of the current coding block. The corner of the block associated with the integer value i1 and the other corner of the block associated with the integer value i2 may share a same edge/side of the block. If linear interpolation is used to interpolate the sample values v0, v1, v2, v3, v4, and v5, the respective weighting factors for each sample value vn calculated based on the values of reconstructed motion vector values ik may be as follows:

$$v0=i1*(5/5)+i2*(0/5),$$

$$v1=i1*(4/5)+i2*(1/5),$$

$$v2=i1*(3/5)+i2*(2/5),$$

$$v3=i1*(2/5)+i2*(3/5),$$

$$v4=i1*(1/5)+i2*(4/5),$$

$$v5=i1*(0/5)+i2*(5/5).$$

Therefore, a formula for calculating the value of a sample in a coding block can be described as follows:

For each sample vx, where $0<=x<=s$, $vx=i1*((s-x)/s)+i2*(x/s)$, where s is the size of the coding block (the number of samples in the coding block).

As noted above, the above formula may require two divisions for generating a MV predictor component, namely (s−x)/s and x/s. The divisions can be implemented using a two-dimensional lookup table when values of x and s are small and the maximum allowed value of the motion vector components (i0, i1) is small. However, in today's video coding technology, a block size of 128 samples in each dimension may be used and even larger block sizes are feasible. Further, a motion vector component length can be considerably larger. For example, motion vectors can be hundreds of samples in length and can be of sub-pel accuracy, resulting in potentially thousands of values. Accordingly, a lookup table may not be economically feasible as the number of table values and associated memory (e.g., ROM) space become too large.

Although division operations can mathematically be substituted by subtractions of the logarithmic value of a divisor and a dividend, logarithmic operations, regardless of whether they are implemented in integer or floating-point computer arithmetic, may use comparatively long code words. Calculating a logarithm may be substitutable by a series of subtractions and conditional statements, or in some cases through a one-dimensional lookup table. Even though the lookup table may be one-dimensional, the size of the lookup table can still be quite large, and conditional statements can be problematic as they may require multiple pipeline steps and need techniques such as speculative execution to execute quickly. Therefore, using logarithms may not be an ideal way of replacing division operations.

To overcome the aforementioned issues, techniques that are limited to certain numbering ranges of input values to be interpolated may be efficiently implemented in hardware and/or software to replace an implementation of an interpolation using division operations in the present disclosure. The numbering ranges of the input values may be applied to the number of interpolation points, the numbering range of the values to be interpolated, and/or the numbering range of the values from which other sample values are interpolated.

Figure 9:
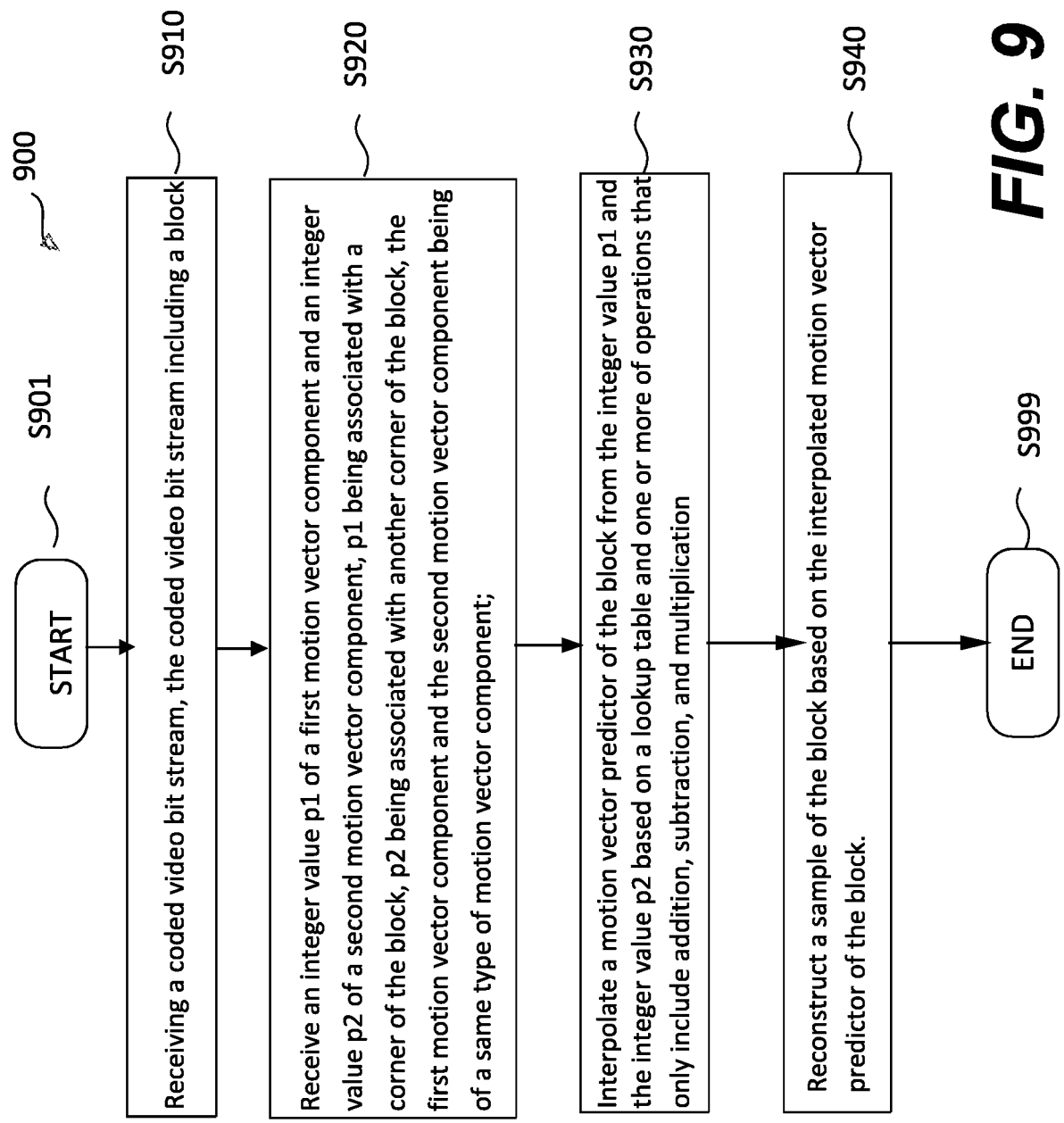
FIG. 9 shows a flow chart outlining a video decoding method according to an embodiment of the disclosure.

FIG. 9 shows a flow chart outlining a process (900) according to an embodiment of the disclosure. The process (900) can be executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), the processing circuitry that performs functions of the predictor (535), the processing circuitry that performs functions of the inter encoder (630), the processing circuitry that performs functions of the inter decoder (780), and the like. In some embodiments, the process (900) is implemented in software instructions, thus when the processing circuitry executes the software instructions, the processing circuitry performs the process (900). The process starts at (S901) and proceeds to (S910).

At (S910), a coded video bit stream is received. The coded video bit stream includes a block, such as the block described above with respect to FIG. 8. The block may be a coding unit, coding block, or a prediction unit. In an embodiment, a product of a width of the block and a height of the block is not a power of two.

At (S920), an integer value p1 of a first motion vector component and an integer value p2 of a second motion vector component are received. The integer value p1 is associated with a corner of the block and the integer value p2 is associated with another corner of the block. The first motion vector component and the second motion vector component may be of a same type of motion vector component. For example, both of the first motion vector component and the second motion vector component may be the horizontal or vertical components of motion vector predictors of the block.

At (S930), a motion vector predictor of the block is interpolated from the integer value p1 and the integer value p2 based on a lookup table and one or more of operations that only include addition, subtraction, and multiplication (e.g., shift). The interpolation is performed based on the linear interpolation and weighting factors described above in one embodiment.

At (S940), a sample of the block is reconstructed based on the interpolated motion vector predictor of the block. The process (900) then proceeds to (S999) and terminates at (S999).

As described in FIG. 9, a technique may be used to replace a division operation when interpolating motion vector component values. The result (fractional number) of a division A1/A2 may be approximated using only operations of addition, subtraction, and multiplication (e.g., shift), and a small size of lookup table of integers. The size of the lookup table determines, among other things, the accuracy of the interpolation. Specifically, the interpolation is more accurate when the lookup table size is larger. The word length of the operation is limited to 16 bits in some embodiments.

Figure 10:
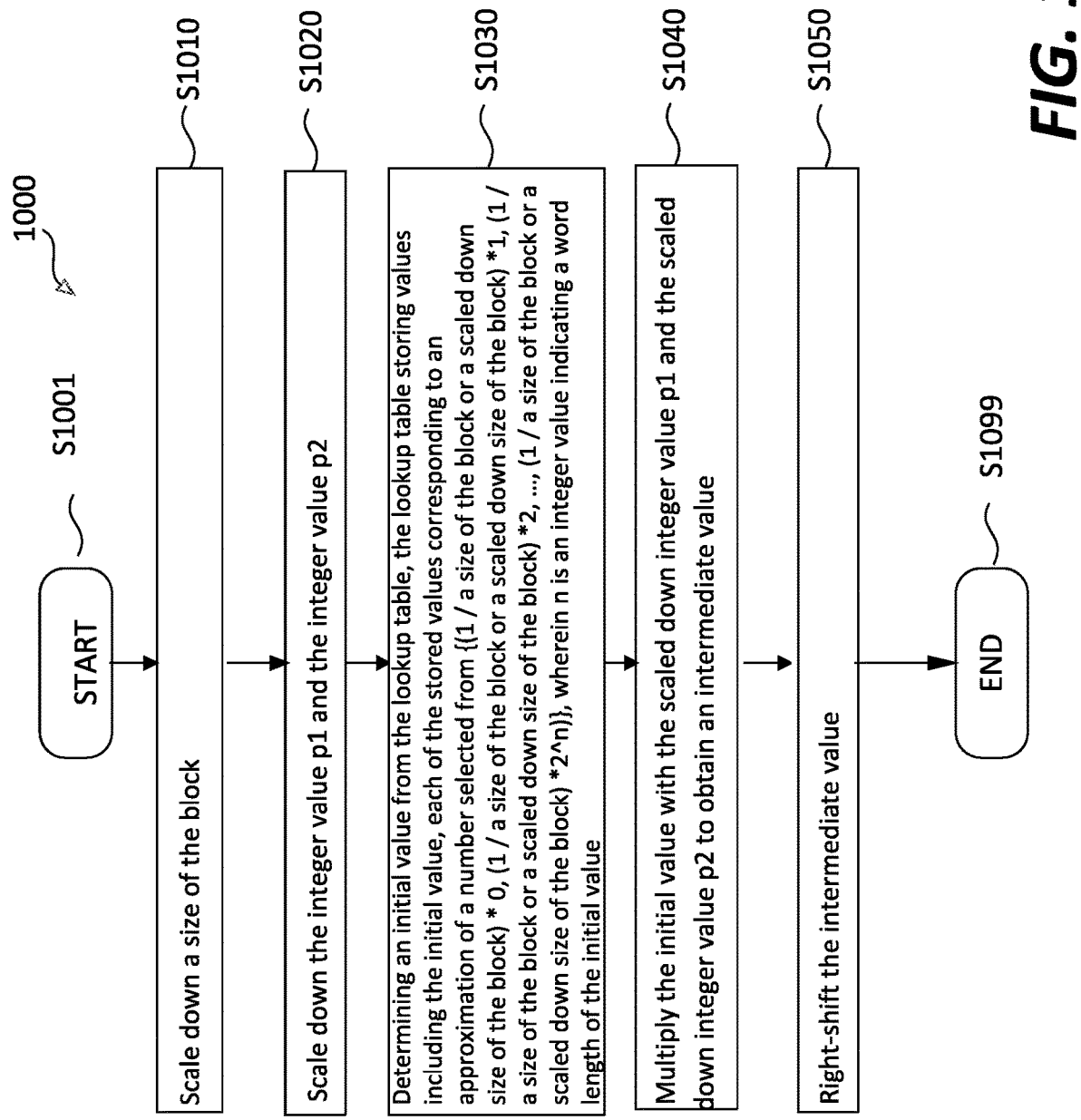
FIG. 10 shows a flow chart outlining an interpolation process according to an embodiment of the disclosure.

FIG. 10 shows a flow chart outlining a process (1000) according to an embodiment of the disclosure. FIG. 10 illustrates an exemplary process for interpolating a motion vector predictor of the block from the integer value p1 and the integer value p2 based on a lookup table and one or more of operations that only include addition, subtraction, and multiplication (e.g., shift). The process (1000) can be executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), the processing circuitry that performs functions of the predictor (535), the processing circuitry that performs functions of the inter encoder (630), the processing circuitry that performs functions of the inter decoder (780), and the like. In some embodiments, the process (1000) is implemented in software instructions, thus when the processing circuitry executes the software instructions, the processing circuitry performs the process (1000). The process starts at (S1001) and proceeds to (S1010).

At (S1010), a divisor value, which may be the size of a block (e.g., s) to which motion vector interpolation is applied, can be scaled down to reduce the size of a required lookup table. In the context of motion vector component interpolation, and in contrast to what is described in JCTVC-C206, this step can be optional in some embodiments of the present disclosure because the block size allowed in video coding technologies can be fixed and may be of a comparatively small size, such as a maximum of 64 or 128 samples. Accordingly, the number of entries in the lookup table can be relatively small without being scaled down in some embodiments.

At (S1020), the motion vector component value, such as i1 or i2 described in FIG. 8 (the dividend), can be scaled down. When using the division technique in the context of motion vector interpolation, the dividend can be of significant size. For example, certain video coding technologies may allow motion vectors to be at 1/16 sample accuracy, and the motion vectors may cover the whole picture width and may include, for example, 4096 samples. In such a case, the numbering range for a motion vector can be +/−65536. Therefore, scaling may be required to keep the bit depth of the calculation in a pre-determined and implementation dependent range. For example, the range can be 16 bits, which means that the range described above can be scaled down to fit into a 16 bit signed number. However, this step is optional in some embodiments of the present disclosure.

At (S1030), an initial value can be determined from a lookup table (e.g., a one-dimensional lookup table) or other data structure. The initial value may be the value of the integer value i1 or i2 multiplied by a fraction. The lookup table may store a plurality of values that includes the initial value. Each of the plurality of values may correspond to a different value selected from, for example, {(1/the size of the block or the scaled down size of the block)*0, (1/the size of the block or the scaled down size of the block)*1, (1/the size of the block or the scaled down size of the block)*2, . . . , (1/the size of the block or the scaled down size of the block)*2^n)}. The initial value may be determined from the lookup table based on various indexing techniques including using a position of a corresponding sample in the block. The output of the lookup table can be an integer of a suitable word length and may approximate the value selected from {(1/the scaled down size of the block)*0, (1/the scaled down size of the block)*1, (1/the scaled down size of the block)*2, . . . , (1/the scaled down size of the block)*2^n)} multiplied by a fixed value. In this case, n can be an integer value indicating the word length of the initial value. However, n+1 may be the word length when signed values are used.

At (S1040), the initial value may be multiplied with the scaled down integer value of i1 and the scaled down integer value of i2 (the dividend) to obtain an intermediate value of the division operation. In one embodiment, if the integer values i1 and i2 are not scaled down in Step 1020, the initial value may be multiplied with the integer values i1 and i2 to obtain the intermediate value of the division operation.

At (S1050), the intermediate value is right-shifted to obtain the division result in the appropriate numbering range. The division result can be used to derive the full interpolated motion vector component, by performing the substantially same steps but with different weighting factors on other input motion vector components. Therefore, some of the values stored in the lookup table may be reused. The process (1000) then proceeds to (S1099) and terminates at (S1099).

If the above steps are performed with a suitable large word length, the above steps can achieve sufficiently accurate results. Such results can also be obtained, when using a word length that is more limited, by appropriately shifting the results between the various steps shown above. The number, direction, and shift-length of the various shift operations can be derived by a person skilled in the art taking into account of a desired word length limit (for example a limit of 16 bits as an input to a multiplication), the numbering range of divisor, the numbering range of dividend, and so forth. JCTVC-C206 describes only one example of shifting the intermediate result.

The advantages of the present disclosure are as follows: (1) the use of resources (e.g., chip surface) for interpolation may be reduced; (2) the run time of the hardware may be shorter; (3) the number of pipeline stalls in the decoder may be reduced; and (4) the design cost may be reduced by reusing a substitute of the division operation whose properties are known, and that has been implemented and tested for a different purpose.

V. Computer System

The techniques described above, can be implemented as computer software using computer-readable instructions and physically stored in one or more computer-readable media. For example, FIG. 11 shows a computer system suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
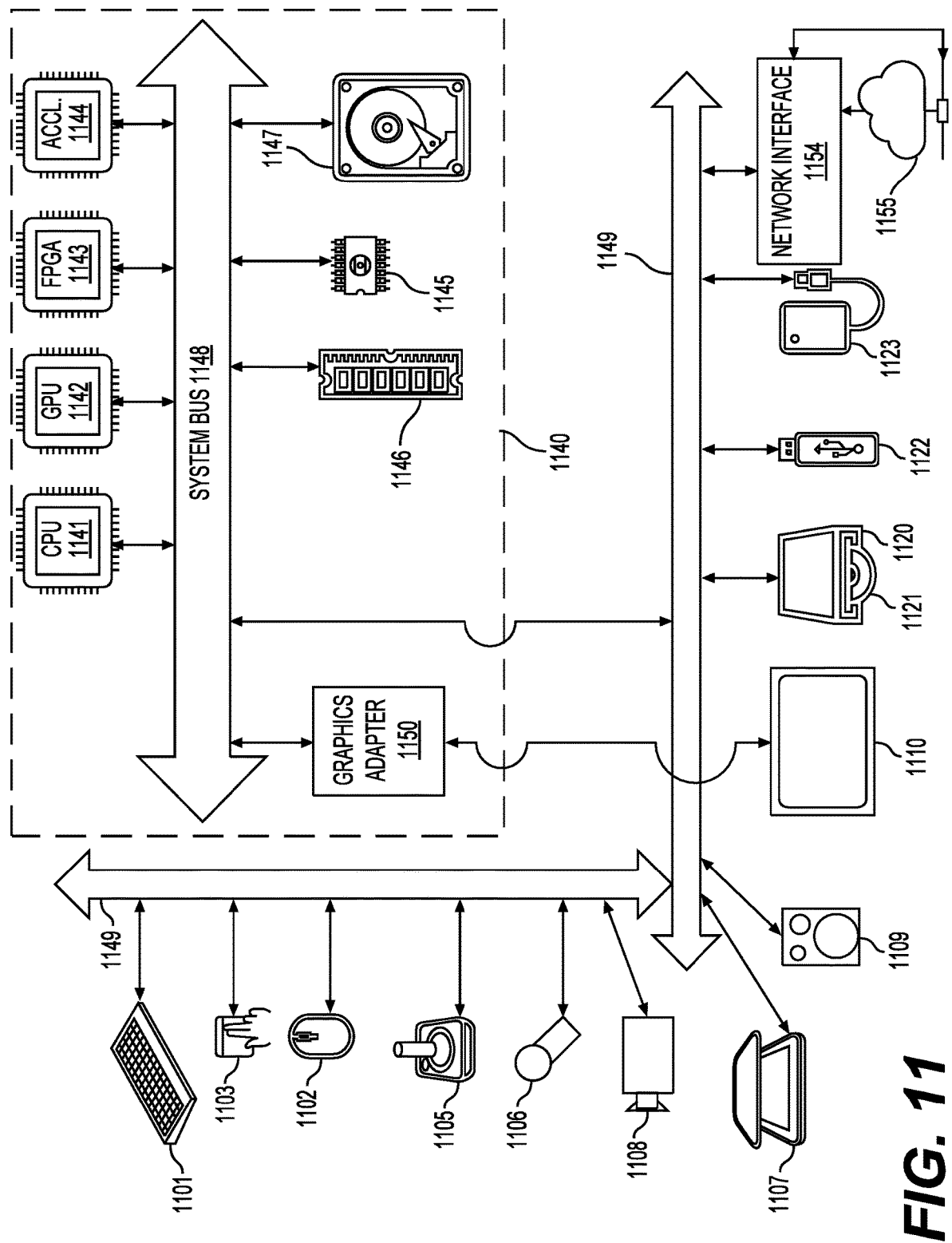
FIG. 11 is a schematic illustration of a computer system in accordance with an embodiment.

The components shown in FIG. 11 for the computer system are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of the computer system.

The computer system may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

The computer system may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

The computer system can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

The computer system can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system; others are commonly integrated into the core of the computer system by attachment to a system bus as described below (for example Ethernet interface into a PC computer system or cellular network interface into a smartphone computer system). Using any of these networks, computer system can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system.

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can be also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture, and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various embodiments of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
HMVP: History-based MVP
MVP: Motion vector predictor
TMVP: Temporal MVP TPM: Triangular prediction mode
VTM: Versatile test model While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding in a decoder, comprising:
receiving a coded video bit stream, the coded video bit stream including a block;
receiving an integer value p1 of a first motion vector component and an integer value p2 of a second motion vector component, p1 being associated with a corner of the block, p2 being associated with another corner of the block, the first motion vector component and the second motion vector component being of a same type of motion vector component;
interpolating a motion vector predictor of the block from the integer value p1 and the integer value p2 based on a lookup table and one or more of operations that only include addition, subtraction, and multiplication; and
reconstructing a sample of the block based on the interpolated motion vector predictor of the block, wherein the interpolating includes
scaling down the integer value p1 and the integer value p2,
determining an initial value from the lookup table, the lookup table storing values including the initial value, each of the stored values corresponding to an approximation of a number selected from {(1/a size of the block)*0, (1/a size of the block)*1, (1/a size of the block)*2, . . . , (1/a size of the block)*2^n)} or {(1/the scaled down size of the block)*0, (1/the scaled down size of the block)*1, (1/the scaled down size of the block)*2, . . . , (1/the scaled down size of the block)*2^n)} wherein n is an integer value indicating a word length of the initial value,
multiplying the initial value with the scaled down integer value p1 and the scaled down integer value p2 to obtain an intermediate value, and
right-shifting the intermediate value.

2. The method of claim 1, wherein the interpolating is a linear interpolation.

3. The method of claim 1, wherein a product of a width of the block and a height of the block is not a power of 2.

4. The method of claim 1, wherein the motion vector predictor is interpolated without using a division operation.

5. The method of claim 1, wherein the corner of the block associated with the integer value p1 and the other corner of the block associated with the integer value p2 share a same edge of the block.

6. The method of claim 1, wherein the interpolating further comprises:
scaling down a size of the block.

7. The method of claim 6, wherein each of the stored values corresponds to the approximation of the number selected from {(1/the scaled down size of the block)*0, (1/the scaled down size of the block)*1, (1/the scaled down size of the block)*2, . . . , (1/the scaled down size of the block)*2^n)}.

8. The method of claim 6, wherein the size of the block is scaled down based on a number of entries in the lookup table.

9. The method of claim 1, wherein each of the stored values corresponds to the approximation of the number selected from {(1/a size of the block)*0, (1/a size of the block)*1, (1/a size of the block)*2, . . . , (1/a size of the block)*2^n)}.

10. An apparatus, comprising:
processing circuitry configured to:
receive a coded video bit stream, the coded video bit stream including a block;
receive an integer value p1 of a first motion vector component and an integer value p2 of a second motion vector component, p1 being associated with a corner of the block, p2 being associated with another corner of the block, the first motion vector component and the second motion vector component being of a same type of motion vector component;
interpolate a motion vector predictor of the block from the integer value p1 and the integer value p2 based on a lookup table and one or more of operations that only include addition, subtraction, and multiplication; and
reconstruct a sample of the block based on the interpolated motion vector predictor of the block, wherein the processing circuitry is configured to
scale down the integer value p1 and the integer value p2
determine an initial value from the lookup table, the lookup table storing values including the initial value, each of the stored values corresponding to an approximation of a number selected fro {(1/a size of the block)*0, (1/a size of the block)*1, (1/a size of the block)*2, . . . , (1/a size of the block)*2^n)} or {(1/the scaled down size of the block)*0, (1/the scaled down size of the block)*1, (1/the scaled down size of the block)*2, . . . , (1/the scaled down size of the block)*2^n)}, wherein n is an integer value indicating a word length of the initial value,
multiply the initial value with the scaled down integer value p1 and the scaled down integer value p2 to obtain an intermediate value, and
right-shift the intermediate value.

11. The apparatus of claim 10, wherein the processing circuitry is configured to linearly interpolate the motion vector predictor of the block.

12. The apparatus of claim 10, wherein a product of a width of the block and a height of the block is not a power of 2.

13. The apparatus of claim 10, wherein the motion vector predictor is interpolated without using a division operation.

14. The apparatus of claim 10, wherein the corner of the block associated with the integer value p1 and the other corner of the block associated with the integer value p2 share a same edge of the block.

15. The apparatus of claim 10, wherein the processing circuitry is configured to scale down a size of the block.

16. The apparatus of claim 15, wherein each of the stored values corresponds to the approximation of the number selected from {(1/the scaled down size of the block)*0, (1/the scaled down size of the block)*1, (1/the scaled down size of the block)*2, . . . , (1/the scaled down size of the block)*2^n)}.

17. The apparatus of claim 15, wherein the size of the block is scaled down based on a number of entries in the lookup table.

18. The apparatus of claim 10, wherein each of the stored values corresponds to the approximation of the number selected from {(1/a size of the block)*0, (1/a size of the block)*1, (1 a size of the block)*2, . . . , (1/a size of the block)*2^n)}.

19. A non-transitory computer-readable medium storing instructions which when executed by a computer for video decoding causes the computer to perform a method, the method comprising:

receiving a coded video bit stream, the coded video bit stream including a block;

receiving an integer value p1 of a first motion vector component and an integer value p2 of a second motion vector component, p1 being associated with a corner of the block, p2 being associated with another corner of the block, the first motion vector component and the second motion vector component being of a same type of motion vector component;

interpolating a motion vector predictor of the block from the integer value p1 and the integer value p2 based on (i) a lookup table, (ii) a right shift operation and (iii) one or more of operations that only include addition, subtraction, and multiplication and reconstructing a sample of the block based on the interpolated motion vector predictor of the block, wherein the interpolating includes scaling down the integer value p1 and the integer value p2 determining an initial value from the lookup table, the lookup table storing values including the initial value, each of the stored values corresponding to an approximation of a number selected from {(1/a size of the block)*0, (1/a size of the block)*1, (1/a size of the block)*2, . . . , (1/a size of the block)*2^n)} or {(1/the scaled down size of the block)*0, (1/the scaled down size of the block)*1, (1/the scaled down size of the block)*2, . . . , (1/the scaled down size of the block)*2^n)}, wherein n is an integer value indicating a word length of the initial value, multiplying the initial value with the scaled down integer value p1 and the scaled down integer value p2 to obtain an intermediate value, and right-shifting the intermediate value.

20. The non-transitory computer-readable medium of claim 19, wherein each of the stored values corresponds to the approximation of the number selected from {(1/a size of the block)*0, (1/a size of the block)*1 (1/a size of the block)*2, . . . , (1/a size of the block)*2^n)}.

* * * * *